United States Patent [19]

Priaroggia et al.

[11] 4,395,869
[45] Aug. 2, 1983

[54] METHOD AND APPARATUS FOR MAKING OPTICAL FIBER CABLE ELEMENT

[75] Inventors: Paolo G. Priaroggia, Milan; Antonio Portinari, Sesto S. Giovanni, both of Italy

[73] Assignee: Societa Cavi Pirelli S.p.A., Milan, Italy

[21] Appl. No.: 350,025

[22] Filed: Feb. 18, 1982

[30] Foreign Application Priority Data

Feb. 24, 1981 [IT] Italy .................. 19934 A/81

[51] Int. Cl.³ .................. G02B 5/16; H01B 13/02
[52] U.S. Cl. .................. 57/13; 57/6;
 57/7; 156/51; 156/53; 156/172
[58] Field of Search .................. 57/6, 7, 9, 13-15;
 156/47, 48, 51, 53, 171, 172

[56] References Cited

U.S. PATENT DOCUMENTS 4,156,624 5/1979 de Vecchis et al. .................. 156/171
4,237,687 12/1980 de Vecchis et al. .................. 57/13 X
4,325,212 4/1982 Hope .................. 57/13 X
4,347,697 9/1982 Hope et al. .................. 57/9

Primary Examiner—John Petrakes
Attorney, Agent, or Firm—Brooks, Haidt, Haffner & Delahunty

[57] ABSTRACT

Methods and apparatus for forming a cable element comprising a core of plastic material with helical surface grooves containing one or more optical fibers. The core has one or more reinforcing elements resistant to tension and compression and is covered with a covering of tape or thermoplastic. The core is fed to a rigid body having tongues corresponding to and entering into the grooves, and the optical fiber or fibers are fed into the grooves through through-holes in the body which extend from the exterior surface of the body to the tongues and which are inclined with respect to the axis of the core. The core feeding means may be a pay-off bobbin or a core extruder with a threading die, and by increasing the feed rate of the fibers relative to the feed rate of the core or by stretching the core in advance of the rigid body, the lengths of the fibers in the grooves may be longer than the lengths of the grooves.

22 Claims, 6 Drawing Figures

METHOD AND APPARATUS FOR MAKING OPTICAL FIBER CABLE ELEMENT

The present invention relates to an improved method and apparatus for producing cable elements comprising optical fibers, which elements are especially adapted for forming telecommunicable cables. In particular, the invention relates to the production of cable elements comprising a shaped, elongated, cylindrical body in the form of a cylindrical core of plastic material having one or several helicoidal grooves on its surface and each groove having one or more optical fibers therein.

The core is reinforced by at least one longitudinal element that is resistent to tension and to compression. The cable element is completed by at least one lapping of one or more helically wound tapes or else, by an extruded sheath.

Generally several cable elements joined together, constitute a telecommunications cable. As is well-known to those skilled in the art, in a cable for telecommunications which is constructed with such cable elements, the fiber or fibers are protected against undue tension, compression and flexing stresses. Cable elements of the above-described type, are already known in the art and have been amply described in previous patents. Methods and apparatus for producing said cable elements are also known. In particular, in British Pat. No. 1,457,868, there is described a system for making a cable element with optical fibers, wherein the fibers payed off from stationary bobbins are guided by pulling means, which are also stationary, towards the grooves of the shaped body which is advanced with a rotary motion towards a lapping head and a collecting device.

This prior art system presents considerable difficulties when inserting the fiber into the grooves. When instances occur of even small variations in the advancing speed of the optical fiber or the core, or of both of these, or even when there are small variations in the helix pitch, because of working tolerances, the fiber can undergo forces which, as is known, could cause damage to the fiber, or else it could be diverted from the correct groove, thus causing a piece of the element to be rejected.

The U.S. Pat. No. 4,205,899 teaches instead, to introduce the optical fibers into the grooves through the means of appendices that become inserted directly into the grooves of the shaped body.

Said appendices form part of a complex and delicate mechanism, formed by a plurality of elements that are, per se, difficult to construct and to maintain. In this mechanism, a fiber, originating from a bobbin, passes along a path that includes holes of two or more parallel discs circumscribing the core and a tubelet having its elastic extremity pressed into the groove. The discs are kinematically linked to one another by gears. As will be understood, the numerous elements at play in said mechanism, render it extremely complicated and costly.

Moreover, it is probable that, even in this case, small variations in velocity of the core or pitch variations coinciding with instantaneous pressure variations on the lay-down appendices inserted into the grooves could not only cause forces on the fiber with the risk of rupturing, in particular, at the singular points of support which coincide with the holes of the discs, but also cause the fiber to divert.

The present invention has as one object the obviating of the above-mentioned drawbacks, by suggesting an improved line for the production of cable elements with optical fibers which is provided with a device for inserting optical fibers directly into the grooves which is simple to manufacture and easy to maintain while presenting to the optical fiber a linear path with a continuous support.

More precisely, the main object of the invention is a method for producing a cable element with optical fibers which comprises a substantially cylindrical core of a plastic material reinforced with at least one longitudinal element that is resistant to tension and to compression, the surface of said core having one or several helicoidal grooves, each groove having at least one optical fiber, said method comprising at least the following steps:

(a) feeding said substantially cylindrical core of plastic material reinforced by at least one longitudinal element resistant to tension and to compression and having one or more helicoidal grooves at its surface, to a cylindrical cavity in a rigid body with its axis coincident with the axis of said cylindrical core, the surface of said cylindrical cavity being provided with lay-down tongues directed radially and having a number at least equal to the number of said grooves;

(b) engaging said lay-down tongues with said grooves for establishing, between the core and rigid body, a coupling of female-thread screw type;

(c) feeding said rigid body with optical fibers, by means of through-holes corresponding to each lay-down tongue and communicating with said cylindrical cavity according to a direction that is inclined with respect to the axis of said cylindrical core; and (d) disposing said optical fibers in their corresponding grooves.

A further object of the invention is an improved production line for carrying out said method and comprising at least means for feeding said core, means for feeding said optical fibers, a means provided with lay-down tongues for inserting said fibers into said grooves, and pulling and collecting means, characterized by the fact that said lay-down tongues, of a number at least equal to the number of grooves, are directed radially and are provided on the surface of the inner cylindrical cavity of a rigid body locally circumscribing said core. Each of said lay-down tongues is suited for engaging with a corresponding groove for establishing, between the core and the rigid body, a coupling of the female-thread screw type, and each lay-down tongue is provided with a rectilineal through-hole, said through-hole crossing said rigid body in the inclined direction with respect to the axis of said core. The entrance opening of said through-hole is on the outer surface of said rigid body and faces towards the optical fiber feeding means, each through-hole constituting a path for transferring the optical fiber directly into the groove.

Another object of the invention is a cable element with optical fibers comprising at least one cylindrical-core of plastic material reinforced with at least one longitudinal element that is resistent to tension, characterized by the fact that it is made with the method described.

Other objects and advantages of the present invention will be apparent from the following detailed description of the presently preferred embodiments thereof, which description should be considered in conjunction with the accompanying drawings in which.

Figure 1:
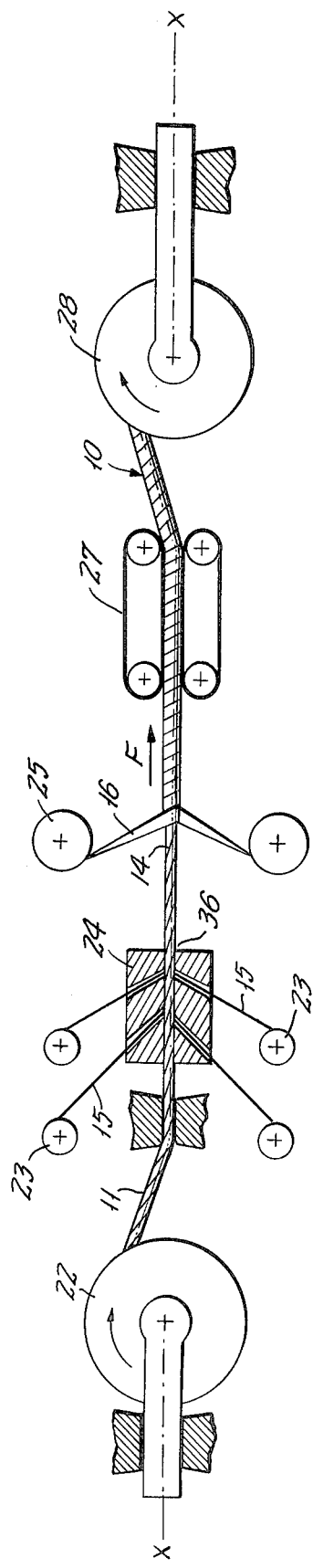
FIG. 1 is a schematic, side elevation view of one form of production line of the invention.

The production line illustrated schematically in FIG. 1 is especially useful for producing a cable element 10 with optical fibers. This cable (see FIG. 2) comprises at least one substantially cylindrical core 11 of a plastic material, for example, one of the plastic materials, polyethylene, polypropylene or nylon, reinforced by at least one longitudinal element 12 that is resistant to tension and compression disposed axially of the core 11. There could also be more than one longitudinal reinforcing element 12. In such a case, the reinforcing elements could be disposed axially of the core 11, or one or more may be axially disposed and the remainder could be spaced from the axis of the core 11. However, they could also be distributed symmetrically in the core 11 with respect to the core axis. The longitudinal reinforcing element 12 is preferably, but not necessarily, constituted by a steel-alloy-nickel, that is commercially known under the trade name "INVAR."

Figure 2:
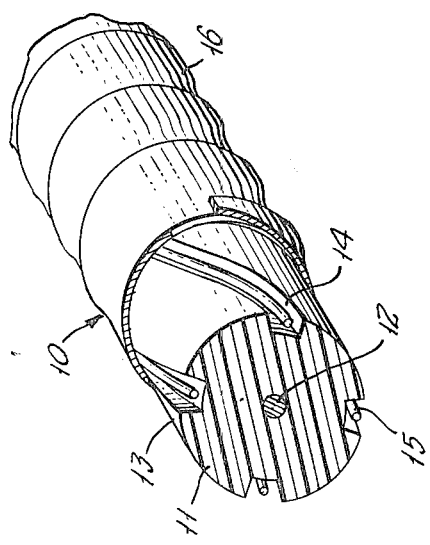
FIG. 2 is a fragmentary, perspective view of a cable element.

The exterior surface 13 of the core 11 has one or several helicoidal grooves 14 therein, four being shown in FIG. 2, thereby providing a body which is shaped in cross-section. Each helicoidal groove receives preferably, but not necessarily, in a loose way, at least one optical fiber 15. There can be more than one, or at most, one or several bundles of optical fibers in each groove 14.

Each optical fiber can moreover, comprise, apart from its own core and primary covering (commonly known in the art under the name "cladding"), one or several coverings that are either adherent to the fibers or loosely enclose them.

Each core 11, containing in each of the respective helicoidal grooves 14 at least one optical fiber 15, is covered by at least one binding 16 of one or several helicoidally wound tapes. In the place of a tape binding 16, the covering could be a sheath of an extruded thermoplastic material, or some other material.

Figure 3:
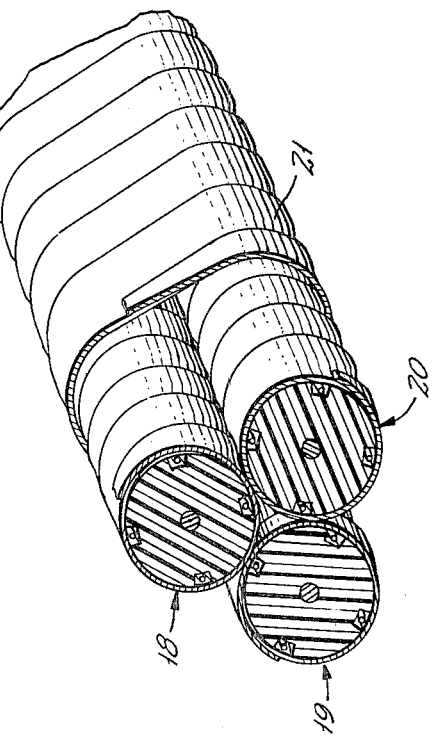
FIG. 3 is a fragmentary, perspective view of a telecommunications cable including three of the cable elements illustrated in FIG. 2.

Generally, several cable elements 10 are brought together to form a telecommunications cable. See, for example, FIG. 3 where three cable elements 18, 19 and 20, of the type which is illustrated in FIG. 2 are laid-up in a per se known way, and they are all covered, all together, by a binding 21 of helicoidally wound tapes. Instead of a binding 21 of tapes over the laid-up cable elements 18, 19 and 20, there could be utilized an extruded plastic material sheath (not shown), or else, an assembly of a plastic material sheath over a binding.

A telecommunications cable could however, as a minimum, be constituted by a single cable element 10 with optical fibers.

The production line of FIG. 1, comprises feeding means 22 for the cylindrical core 11 having helicoidal grooves 14. In the illustrated case, the feeding means 22 is a pay-off bobbin. Thus, it is assumed that the cylindrical core 11 was produced in a step apart from the line, was wound onto a take-up bobbin 22, and then, successively supplied to the line of FIG. 1.

A core 11 with helicoidal grooves 14, can be obtained in a per se known way, either through extrusion with a rotating screw, by twisting a cylindrical element having longitudinal grooves, or even, by an extrusion process with simultaneous twisting.

Figure 6:
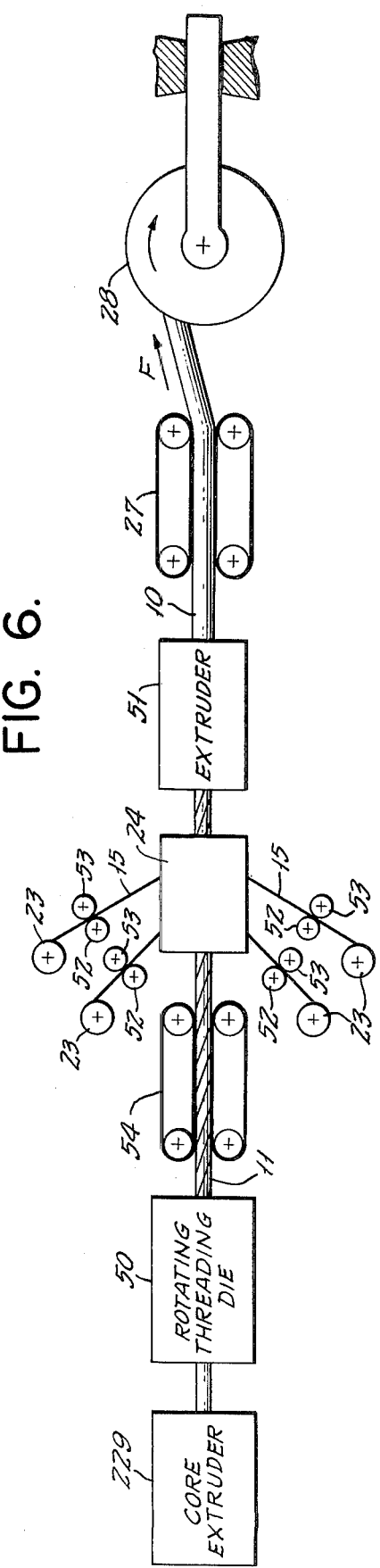
FIG. 6 is a schematic illustration, similar to FIG. 1, of an alternative embodiment of the production line of the invention.

Naturally, the feeding means for the cylindrical core of FIG. 1, could be different from a pay-off bobbin 22. For example, in place of the pay-off bobbin 22, there could be directly installed an extruder head 22a with a rotating screw, as is illustrated in FIG. 6, or some other per se known means, for producing a cylindrical core with helicoidal grooves.

Figure 4:
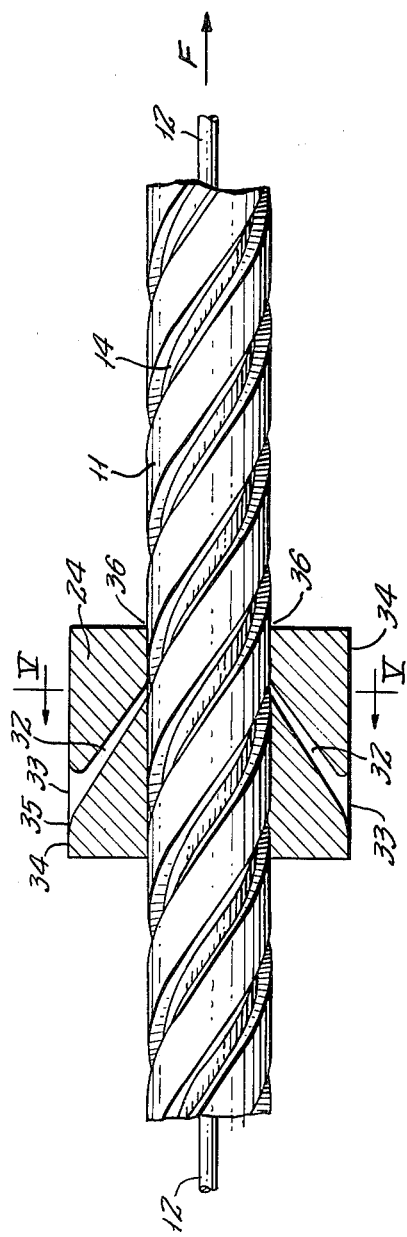
FIG. 4 is an enlarged, side elevation view, partly in cross-section, of the optical fiber feeding means, illustrated in FIG. 1, in association with a cable element core.

The production line of FIG. 1 comprises, moreover, feeding means for the optical fibers, for example, bobbins 23, a means 24 (see also FIG. 4) provided with lay-down tongues 29 (see FIG. 5) directed radially for the inserting of the fibers 15 into the grooves 14, a lapping head comprising one or several bobbins 25 for feeding the tape 16, a pulling means or caterpuller 27, and a collecting means, such as, for example, a take-up bobbin 28.

In place of the lapping head, there could be another device appropriate for providing the core 11 with a different type of covering in place of the binding of tape 16. An extruder head 51 (see FIG. 6) could, for example, be substituted for the lapping head. The pulling means or caterpuller 27, could also be omitted and the pulling action could be carried out directly by the take-up bobbin 28. The means 24, is a rigid body apt for locally circumscribing the core 11. The rigid body 24 may be made, for example, from one of the following materials: a metal, preferably, an aluminum and/or magnesium alloy, even though not exclusively, tetrafluoroethylene, carbon or glass fibers bound with an epoxy resin, a synthetic elastomeric polymer, for example, a rubber, etc.

Figure 5:
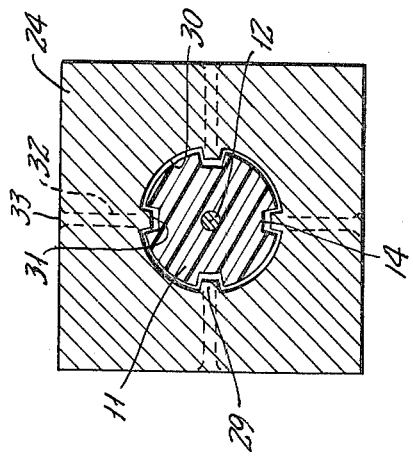
FIG. 5 is a cross-section of the embodiment illustrated in FIG. 4 and is taken along the line IV—IV shown in FIG. 4.

The lay-down tongues 29 of said means 24, having a number at least equal to the number of grooves of the core 11, are provided on the inner surface of the cylindrical cavity 30 (see FIG. 5). Each one of said lay-down tongues 29, is adapted to fit into a corresponding groove 14 of the core 11, in such a way as to establish a coupling of the female-thread screw type, between the core 11 and the rigid body 24. It results from this that the rigid body 24 could also be called a female-thread nut.

Each lay-down tongue 29 is provided with a rectilinear through-hole 32, crossing the rigid body 24 itself in the inclined direction with respect to the axis cylindrical core axis 11 and having an entrance-opening on the outer surface 34 of the rigid body 24 facing towards a feeding bobbin 23 for the optical fiber or fibers. The exit-opening 31 of said through-hole 32 preferably, faces, mainly, towards the exit 36 of the cylindrical cavity 30.

Each through-hole 32 constitutes a transferring and guiding means for at least one fiber 15, from the bobbin 23 until it is inside the corresponding groove 14. During its passage through the through-hole 32, the optical fiber is protected from any risks of abrasions and tears, the edge 35 of the entrance opening 33 being, in fact, preferably bevelled and rounded-off.

The invention is described and illustrated with reference to a single lay-down tongue 29 for each groove 14. Said lay-down tongues could, however, also be a plurality of lay-down tongues for each groove 14, each tongue distributing one or more optical fibers. Said plurality of lay-down tongues for each groove, will be disposed according to a helix having the same pitch as the groove 14. All the lay-down tongues 29 of the plurality could be united together by a screw thread having the same pitch as the groove 14, with which it is to be engaged.

In the form of realization of the production line illustrated in FIG. 1, both the feeding means of the core, as well as the collecting means, bobbins 22 and 28 respectively, rotate around their respective axes. Moreover, the bobbins 22 and 28 together with the pulling means or caterpuller 27, all rotate, in the same direction and with an equal number of turns per time-measurement (TMU) around the axis X—X of the line. The latter axis coincides also with the axis of the core 11 from the pay-off bobbin 22 which is advancing in the direction of the take-up bobbin 28 of the finished cable element 10.

The arrow F, (see FIGS. 1 and 4) indicates the advancing direction of the core 11. The nut 24, the bobbins 23 and the lapping head with its own bobbins 25 are stationary with respect to the core 11. The bobbins 23 and 25 are provided only with rotation on their respective axes. Although not necessary, the bobbins 23 can be equipped with rotation means for untwisting the fiber. This rotation would be had around a pre-fixed axis for each bobbin.

The core 11, coming from the bobbin 22, advances with a constant velocity and a rotatory translation motion resulting from the translation communicated by the pulling device or caterpuller 27, and the rotation of the latter from the winding bobbin 28 and the pay-off bobbin 22 around the axis X—X.

This causes the core 11, transiting axially through the cavity 30 of the nut 24, to become screwed into the nut. In this way, each one of the grooves 14, is caused to continuously engage the respective lay-down tongue 29. That is, the optical fiber 15, which comes from bobbin 23 and passes through the entrance-opening 33, transits along the transferring and guiding through-hole 32, becomes directly placed, by way of the exit-opening 31 present on the lay-down tongue 29, continuously and longitudinally within the entire groove 14.

The fiber is, moreover, placed in the corresponding groove with an inclination which is due only to the helix of the grooves. The angle which is formed by the helix of the groove 14 and the inclined direction of said through-hole 32 is such to give the fiber, in the passing zone from through-hole 32 to groove 14, a curvature which is smaller than the maximum admissible curvature of the fiber itself.

In the described case where the core is advancing with a rotary translation motion, it may occur that, for example, because of the deviation of the core pitch with respect to the the nominal value, the rigid body 24 is urged to undergo to and/or fro translatory shiftings, said shiftings are used by a preferably electronic device (not shown) for affecting the movement of the rotating elements to correct the rotation/advancing ratio of the core, so as to maintain substantially inaltered the position of said rigid body.

In continuing to advance, the core 11 (already provided with optical fibers 15) will be wound-up with the tapes 16 which carry out, in this manner, the completion of the cable element 10. The latter is pulled by the caterpuller 27 and becomes wound over a take-up bobbin 28 where it is stored.

Whenever, in place of the lapping head, there should be used an extruder head 51 (FIG. 6), the core 11 already provided with optical fibers, would be clad in a sheath. The latter could be formed from a thermoplastic material or from other suitable material.

The invention can be realized by maintaining stationary, with respect to the axis of the core 11, the feeding means of the core 11, the bobbin 22 in the line of FIG. 1, as well as the pulling and collecting means (in the line of FIG. 1, the caterpuller 27 and the bobbin 28), while the assembly, constituted by the nut 24 with the lapping head and the respective bobbins 23 and 25, will be rotatable around the axis X—X. In this case, the core 11 advances with a constant velocity and translating motion communicated to it by the pulling device 27. The rigid body or nut 24 screws onto the core 11. Even in this instance the lay-down tongues 29 follow longitudinally, with continuity, the respective grooves 14 while disposing inside the grooves 14 the fibers 15.

When the core 11 has a translating motion, while the assembly constituted by the nut 24 with the lapping head and the respective bobbins 23 and 25 is rotatable around the axis X—X, the synchronization of the rotation velocity of the cage carrying the reels 23 with the rotation velocity of the rigid body 24 is foreseen, for taking into account possible variations of the helix pitch with respect to the nominal pitch. Said synchronization is caused by a proper preferably electronic means able to take also little variations of said magnitudes and to turn said survey into controls for the operation of the feeding of the fibers.

Downstream of the nut 24, the bobbins 25 rotate around the core 11, advancing towards the caterpuller 27, and wind it up with the tapes 16.

Of course, even in this case, in place of the lapping head, an extruder head, such as the head 51, could be provided.

The caterpuller 27 draws the cable element 10 towards the collecting bobbin 28 for storage.

The production line 1, as described hereinbefore, disposes fibers 15 loosely into the grooves 14, these fibers 15 having the same length as the grooves 14 which receive them when the groove 14 is in a rest condition or state.

The invention foresees, however, also the obtaining of cable elements with optical fibers therein which have a length greater than the length of the grooves 14 of the core 11 in a rest condition or state (in the absence of tensile forces and compressional or flexional stresses applied to the core) and at a given temperature, for example, room temperature.

One way of meeting this last-mentioned requirement of the product, each fiber 15, or each group of fibers directed to the same through-hole 32, are fed at a rate which will cause the fibers 15 to be longer than the grooves 14 by installing upstream of the latter, a thrusting means adapted to increase the velocity of the fiber 15 with respect to the advancing speed of the cylindrical core 11. Said thrusting means may consist, for example, of a pair of rollers 52 and 53 which clamp the fiber or fibers and which are rotated on their own axes in opposite directions, one with respect to the other, or such as to push the fiber in its advancing direction.

Alternatively, the increased fiber length relative to the groove length can be obtained by acting on the cylindrical core 11 instead of on the fiber. One solution, according to the last-mentioned method, foresees the application of a breaking device for the cylindrical core 11, upstream of the cylindrical cavity 30 of the rigid body or nut 24 and opposing the pull (exercised by the caterpuller 27 or by the collecting device 28) downstream of the same cavity 30 (see FIG. 6).

The braking device can consist of a caterpuller 54. The braking of the core 11 in the zone at least preceding the laying-down of the fiber in the groove 14 and until a zone successive to the exit of the core 11 from the cylindrical cavity 30, permits, with the advancing velocity of the line being constant, elongation of the core 11 from the point where the braking is applied to said successive zone. The brake will be calibrated in such a manner that the elongation will take place "elastically", that is, it is such, as to return the core 11, at said successive zone, to its initial length. Thus, when the core 11 returns to its initial rest length with respect to its elongated state produced by the "braking," the length of the grooves 14 become less than the length of the fibers which are inserted into the grooves.

Particular attention is drawn to the fact that the nut 24 with its lay-down tongues 29, besides having the function of disposing the fibers directly into the grooves 14, also prevents any diverting of the fibers whenever small variations should occur in the pitch of the helix, because this nut 24 exercises small corrections in the pull upon the core 11. The nut 24 can, moreover, itself function without any intervention or assistance from a further pulling means. Thus, for favoring the pulling, or else the braking of the core 11, the nut 24 (through appropriate means) may be caused to shift by a small amount, respectively, in the direction of movement of the core 11, or in the opposite direction.

Grooves having a helicoidal configuration have been described, but it must be understood, however, that these helicoidal grooves would also have periodically an alternate configuration. In the last-mentioned case, even the rotation around the axis X—X of the feeding means for the core 11 and of the collecting means in the case of the stationary nut 24 (or else, the rotation of the nut 24 in the case of the stationary feeding means and the collecting means for the core 11) will periodically vary in its direction.

Of course, the production line could also include further elements which may be needed for added operations.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Method for producing a cable element with optical fibers, said element having a core of a plastic material with at least one longitudinally extending groove in the peripheral surface thereof, at least one element embedded in said core for resisting tension and compression forces applied to said core and at least one longitudinally extending optical fiber in said groove, said method comprising:

longitudinally advancing said core without said fiber in said groove;

engaging the walls of said groove with a rigid body having a lay-down tongue extending into said groove, for establishing between said core and said lay-down tongue, a coupling of screw female-thread type, said tongue having a through-hole with its axis extending at an acute angle to the axis of said core; and as said core is advanced, feeding by feeding means at least one optical fiber to said groove respectively through the through-hole of the respective tongues.

2. Method as set forth in claim 1 wherein said tongue and the feeding means are kept stationary peripherally of the axis of the core and said core is rotated around its axis as the core is advanced.

3. Method as set forth in claim 1 wherein said tongue and said feeding means are rotated around the axis of said core as it is advanced.

4. Method as set forth in claim 1, 2 or 3 wherein the angle formed by the helix of the groove and the inclined direction of said through-hole is such to give the fiber, in the passing zone from through-hole to groove, a curvature which is smaller than the maximum admissible curvature of the fiber itself.

5. Method as set forth in claim 4 wherein the linear rate of feeding of the optical fiber is greater than the linear rate of movement of the groove into which the fiber is fed so that the length of a fiber in a groove is greater than the length of the groove.

6. Method as set forth in claim 5 wherein the greater linear rate of feeding of the fiber is obtained by pushing the fiber into its corresponding through-hole.

7. Method as set forth in claim 4 wherein said core is elongated less than its elastic limit prior to reaching said tongues and is allowed to contract after the fibers are inserted in the grooves so that the lengths of the fibers in the respective grooves is greater than the lengths of the respective grooves.

8. Method as set forth in claim 7 wherein said core is elongated by braking it at a point in advance of the tongue and by pulling it at a point downstream of the tongue.

9. Apparatus for producing a cable element with optical fibers, said element having a core of a plastic material with at least one longitudinally extending groove in the peripheral surface thereof, at least one element embedded in said core for resisting tension and compression forces applied to said core and at least one longitudinally extending optical fiber in said groove, said apparatus comprising:

a rigid body having an opening for receiving said core, the surface of said body surrounding said opening having one or more lay-down tongues, at least equal in number to the number of grooves, extending radially therefrom and toward the axis of said opening, each of said tongues being disposed so as to be received in a groove, and being suited for engaging with a corresponding groove for establishing, between core and rigid body, a coupling of screws female-thread type, said body also having a through-hole therein extending from the outer surface of said body to the innermost surface of each tongue, each through-hole having its axis inclined at an acute angle to the axis of said opening so that its exit end at a tongue is spaced longitudinally of the axis of said opening from its inlet end at the outer surface of said body;

feeding means for feeding said core longitudinally through said opening in said body with the inlet end of each through-hole nearer to said feeding means than the exit end of each through-hole and with each tongue in a respective groove in said core;

feeding means for feeding at least one optical fiber to each groove through a respective through-hole from the inlet ends to the exit ends thereof and thereby inserting at least one optical fiber in each groove as the core is fed through said opening; and collecting means at the side of said rigid body remote from said feeding means for collecting said core with optical fibers in each groove.

10. Apparatus as set forth in claim 9 wherein there are a plurality of lay-down tongues for each groove, the last-mentioned tongues being disposed along a line having the same pitch as the groove on the core in which they are received.

11. Apparatus as set forth in claim 10 wherein said last-mentioned tongues are joined together.

12. Apparatus as set forth in claim 9, 10 or 11 wherein said rigid body is made from a metal from the group consisting of aluminium, magnesium and mixtures and alloys thereof.

13. Apparatus as set forth in claim 9, 10 or 11 wherein said rigid body is made from a synthetic, elastomeric polymer material.

14. Apparatus as set forth in claim 9 further comprising covering means intermediate said rigid body and said collecting means for applying a covering over said core with at least one optical fiber in each groove thereof.

15. Apparatus as set forth in claim 14 wherein said covering means comprises means for winding a tape around said core.

16. Apparatus as set forth in claim 14 wherein said covering means comprises an extruder for extruding a sheath over said core.

17. Apparatus as set forth in claim 9 wherein said feeding means comprises an extruder for extruding said core and a rotatable threading die for forming at least one groove at the surface of said core.

18. Apparatus as set forth in claim 9 further comprising means for preventing rotation of said rigid body around the axis of said core and means for rotating said feeding means and said collecting means around the axis of said core.

19. Apparatus as set forth in claim 9 wherein said rigid means is rotatably mounted for rotation around the axis of said core.

20. Apparatus as set forth in claim 9 further comprising means for increasing the length of the fiber with respect to the length of the groove in which the fiber is deposited.

21. Apparatus as set forth in claim 20 wherein said last-mentioned means comprises means engaging the fiber for pushing the fiber into the through-hole and thereby increasing the advancing feed of the fiber relative to the advancing speed of the groove in which the fiber is deposited.

22. Apparatus as set forth in claim 20 wherein said last-mentioned means comprises braking means intermediate said feeding means and said rigid body engaging said core for retarding and stretching said core and wherein said collecting means includes means for pulling said core.

* * * * *